United States Patent
Sengupta et al.

(10) Patent No.: US 9,207,344 B2
(45) Date of Patent: Dec. 8, 2015

(54) COMBINING GEOMECHANICAL VELOCITY MODELING AND TOMOGRAPHIC UPDATE FOR VELOCITY MODEL BUILDING

(75) Inventors: Madhumita Sengupta, Houston, TX (US); Ran Bachrach, Binyamina (IL); Konstantin S. Osypov, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 1071 days.

(21) Appl. No.: 12/478,714

(22) Filed: Jun. 4, 2009

(65) Prior Publication Data

US 2009/0303834 A1 Dec. 10, 2009

Related U.S. Application Data

(63) Continuation of application No. 61/059,220, filed on Jun. 5, 2008.

(51) Int. Cl.
*G01V 1/28* (2006.01)
*G01V 1/30* (2006.01)

(52) U.S. Cl.
CPC ..................................... *G01V 1/303* (2013.01)

(58) Field of Classification Search
CPC ........... G01V 1/303; G01V 1/30; G01V 1/32; G01V 1/34; G01V 1/42; G01V 1/306; G01V 1/307; G01V 1/282
USPC ......... 73/152.01; 367/57, 103, 105, 119, 122, 367/37, 38, 50, 58, 59, 73; 702/13, 14, 15, 702/179, 181, 189, 198; 706/20
See application file for complete search history.

(56) References Cited

U.S. PATENT DOCUMENTS

| 4,926,393 | A  | * | 5/1990  | McClellan et al. ............. 367/57 |
| 5,999,489 | A  | * | 12/1999 | Lazaratos ....................... 367/57 |
| 6,181,643 | B1 | * | 1/2001  | Nielsen ......................... 367/105 |
| 6,389,361 | B1 | * | 5/2002  | Geiser ............................. 702/15 |
| 6,546,339 | B2 |   | 4/2003  | Bevc et al. |
| 6,714,873 | B2 | * | 3/2004  | Bakulin et al. .................. 702/14 |
| 6,766,280 | B2 | * | 7/2004  | Takeuchi et al. .............. 702/189 |
| 7,242,637 | B2 | * | 7/2007  | Van Den Beukel et al. ..... 367/38 |
| 7,349,807 | B2 |   | 3/2008  | Moos et al. |
| 2007/0094180 | A1 | * | 4/2007 | Rifkin et al. .................... 706/20 |
| 2008/0033656 | A1 |   | 2/2008 | Herwanger |

FOREIGN PATENT DOCUMENTS

GB   2409900   A   *   7/2005

OTHER PUBLICATIONS

Press et al., Numerical Recipes in C++, The Art of Scientific Computing, 2nd ed., Cambridge University Press, 2002, pp. v-x.*
Golub et al., Matrix Computations, 3rd. ed., The Johns Hopkins University Press, 1996, pp. vii-ix.*

(Continued)

*Primary Examiner* — Daniel L Murphy
(74) *Attorney, Agent, or Firm* — Abimbola Bukoye; Gary Gex

(57) ABSTRACT

A method for updating a velocity model of a subsurface of the earth is described herein. A tomographic update to the velocity model of the subsurface may be performed to generate a tomographic velocity model update. A geomechanical velocity model update of the subsurface may be calculated. The geomechanical velocity model update may be combined with the tomographic velocity model update.

19 Claims, 4 Drawing Sheets

(56) References Cited

OTHER PUBLICATIONS

Stork, et al., Linear Aspects of Tomographic Velocity Analysis, Geophysics, Apr. 1991, pp. 483-495, vol. 56, No. 1.

Woodward, et al., A Decade of Tomography, Geophysics, Sep.-Oct. 2008. pp. VE5-VE11, vol. 73, No. 5.

Detournay, et al., Fundamentals of Poroelasticity, Comprehensive Rock Engineering: Principles, Practice and Project, 1993, Chapter 5, pp. 8-9, vol. 2.

Kachanov, A Microcrack Model of Rock Inelasticity, Mechanics of Materials, 1982, pp. 19-27, vol. 1.

Witcombe, et al., Depth-Velocity Model Building using Multi-Scale Tomography—Part 2, SEG Annual Meeting, 2006, pp. 3364-3367.

PCT Search Report, dated Jan. 8, 2010, Application No. PCT/US2009/046365.

* cited by examiner

COMBINING GEOMECHANICAL VELOCITY MODELING AND TOMOGRAPHIC UPDATE FOR VELOCITY MODEL BUILDING

CROSS-REFERENCE TO RELATED APPLICATIONS

This application claims benefit of U.S. provisional patent application Ser. No. 61/059,220, filed Jun. 5, 2008, which is herein incorporated by reference.

BACKGROUND

Implementations of various technologies described herein generally relate to the field of geology and geophysics and more particularly, to combining geomechanical velocity modeling and tomographic update for velocity model building.

FIELD OF THE INVENTION

Description of the Related Art

The following descriptions and examples do not constitute an admission as prior art by virtue of their inclusion within this section.

Various techniques (e.g., electromagnetic or seismic techniques) exist to perform surveys of a subterranean structure for identifying subterranean bodies of interest. Examples of bodies of interest in the subterranean structure include hydrocarbon bearing reservoirs, gas injection zones, thin carbonate or salt layers, and fresh water aquifers. One type of electromagnetic (EM) survey technique is the controlled source electromagnetic (CSEM) survey technique, in which an electromagnetic transmitter, called a "source," is used to generate electromagnetic signals. Surveying units, called "receivers," are deployed on a surface (such as at the sea floor or on land) within an area of interest to make measurements from which information about the subterranean structure can be derived. The receivers may include a number of sensing elements for detecting any combination of electric fields, electric currents, and/or magnetic fields.

A seismic survey technique uses a seismic source, such as an air gun, a vibrator, or an explosive to generate seismic waves. The seismic waves are propagated into the subterranean structure. A portion of the seismic waves may be reflected back to the surface (e.g., earth surface, sea floor, sea surface, or well-bore surface) by reflectors in the subterranean structure. The reflected portion of the seismic waves may be received by seismic receivers (e.g., geophones, hydrophones, etc.).

Measurement data (e.g., seismic data or EM data) is analyzed to develop a model of a subterranean structure. The model can include, as examples, a velocity profile (in which velocities at different points in the subterranean structure are derived), a density profile, an electrical conductivity profile, and the like.

Conventionally, to update a model used in seismic or EM tomography of the subterranean structure, a linearized forward problem can be solved using a least squares technique, such as by using a least squares quadratic relaxation (LSQR) solver. However, should new information become available or if it becomes desirable to consider variations of prior information, then the least squares inversion would have to be repeated to update the model. Repeating the inversion is computationally very expensive.

SUMMARY

Described herein are implementations of various technologies for combining geomechanical velocity modeling and tomographic update for velocity model building. In one implementation, a method for updating a velocity model of a subsurface of the earth is described herein. A tomographic update to the velocity model of the subsurface may be performed. A geomechanical velocity model update of the subsurface may be calculated. The geomechanical velocity model update may be combined with the tomographic velocity model update.

In another implementation, the velocity model may be an anisotropic velocity model. A difference between a combination produced by a first iteration and a combination produced by a second iteration of the steps described above may be determined. The steps may be repeated until the difference is less than a specified threshold. In yet another implementation, the velocity model may be an isotropic velocity model.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

One or more implementations of various techniques for combining geomechanical velocity modeling and tomographic updates for velocity model building will now be described in more detail with reference to FIGS. 1-4 in the following paragraphs.

Figure 1:
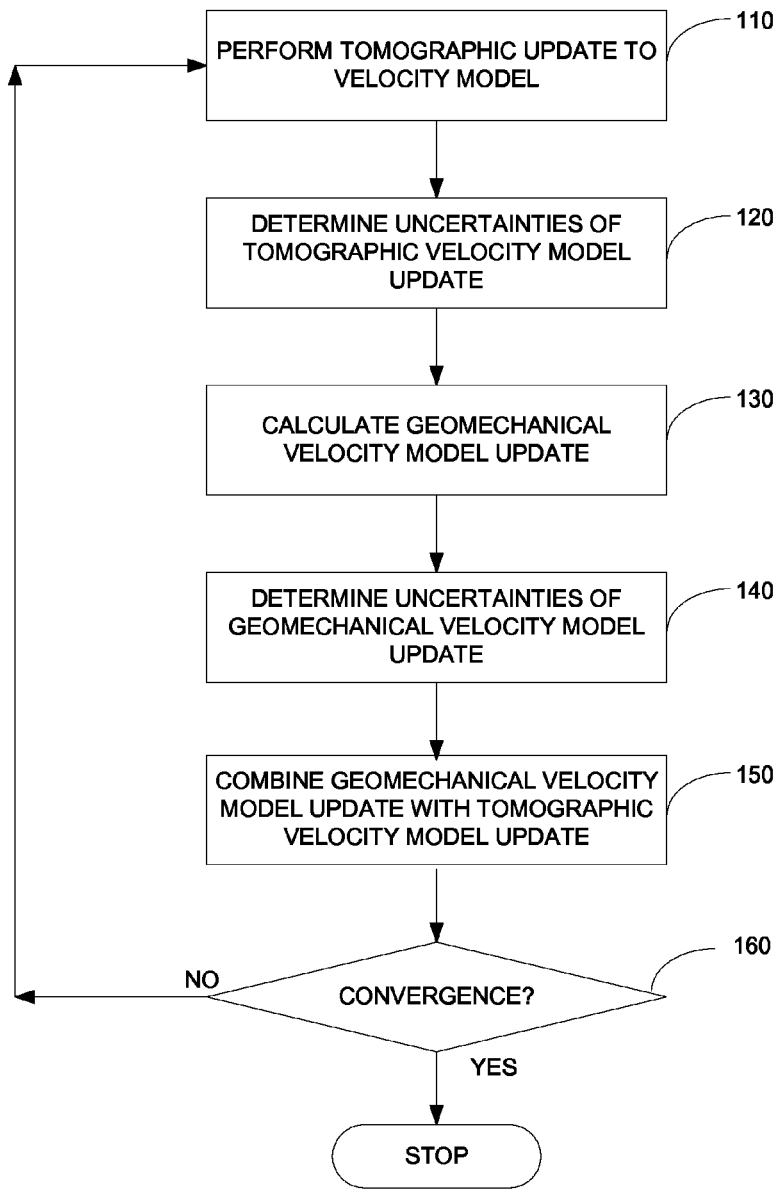
FIG. 1 is a flowchart illustrating a method for combining geomechanical velocity modeling and a tomographic update for velocity model building in accordance with implementations described herein.

FIG. 1 is a flowchart illustrating a method 100 for combining geomechanical velocity modeling and a tomographic update for velocity model building in accordance with implementations described herein. It should be understood that while the flow chart indicates a particular order of execution of the operations, in some implementations, certain steps of method 100 may be executed in a different order.

At step 110, a tomographic update to a velocity model may be performed. The velocity model may be an isotropic or anisotropic model of a subsurface. The tomographic update to the velocity model may be based on survey data regarding the subsurface. Additionally, the tomographic update may be performed using a partial eigendecomposition of a Fisher information operator having the survey data.

Eigendecomposition refers to the decomposition of a matrix into eigenvectors and eigenvalues. In the context of subterranean tomography, the eigenvectors and eigenvalues may represent a "behavior" of an operator that can be used to update the velocity model.

Typically, a linearized forward problem may be used to calculate the update. Such linearized forward problem may be represented by the following:

$$\Delta y = A\Delta x + n, \quad \text{(Equation 1)}$$

where $\Delta y$ may represent a change in data, $\Delta x$ may represent a change to the model, n may represent noise, and A may represent a large sparse matrix. In one implementation, A may be obtained from the discretization of the Frechet derivatives of a non-linear operator. The non-linear operator may model the sensitivity of the picks to the velocity, and optionally, anisotropy parameters. The non-linear operator may be referred to as a tomographic operator, which may be based on ray tracing or waveform modeling.

Preconditioned least squares is a common technique for solving the linearized forward problem. In the preconditioned least squares technique, the model may be pre-conditioned by $\Delta x = P\Delta x_p$. As such, Equation 1 becomes:

$$\Delta y = AP\Delta x_p + n. \quad \text{(Equation 2)}$$

Equation 2 may be solved for $\Delta x_p$, which may be defined accordingly:

$$\Delta x_p = I_P^{-1} P^T A^T D^{-1} \Delta y, \quad \text{(Equation 3)}$$

where $D = E[nn^T]$ is the noise covariance, and $$I_P = P^T A^T D^{-1} AP \quad \text{(Equation 4)}$$

is a Fisher information matrix that corresponds to the precondition model parameterization, $\Delta x_p$.

Figure 2:
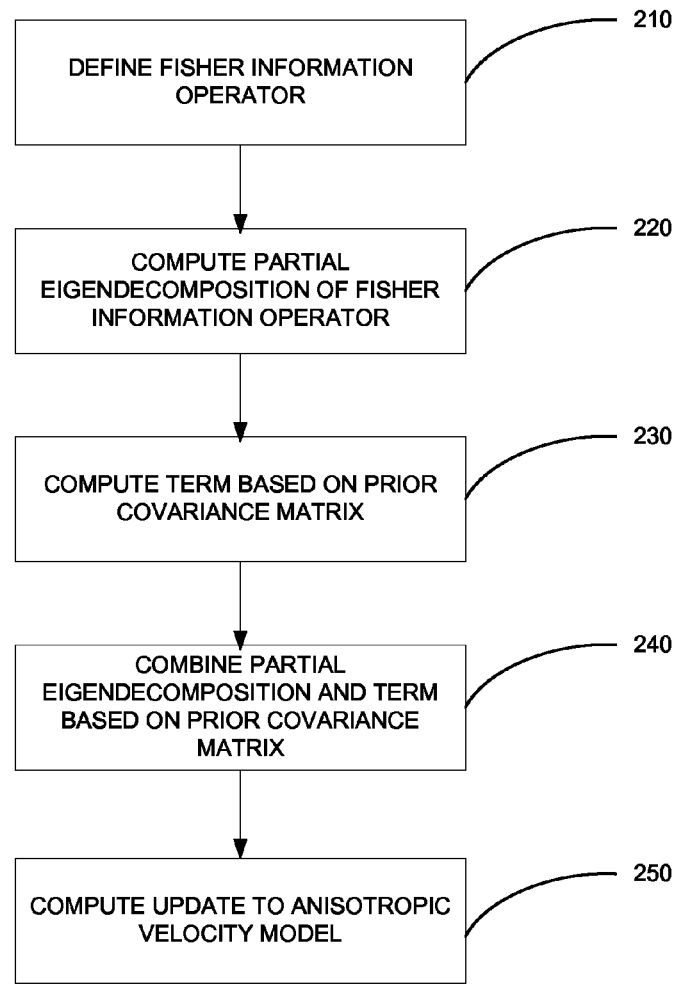
FIG. 2 is a flowchart illustrating a method for a tomographic update to a velocity model in accordance with implementations described herein.

FIG. 2 is a flowchart illustrating a method 200 for the tomographic update to the velocity model in accordance with implementations described herein. At step 210, a Fisher information operator may be defined. A representation of the Fisher information operator may be the Fisher information matrix $I_p$, used to compute $\Delta x_p$ according to Equation 3. As discussed above, the Fisher information matrix may be defined by data structures (shown in Equation 4) containing values derived from survey data collected using active survey sources, such as active seismic sources (e.g., air guns, vibrators, explosives, etc.), an active electromagnetic (EM) source, ground penetrating radar, and the like.

At step 220, a partial eigendecomposition of the Fisher information operator may be computed. In one implementation, an Arnoldi iteration technique may be used to compute the partial eigendecomposition. In another implementation, a Lanczos iteration technique may be used to compute the partial eigendecomposition.

The following sets forth a procedure for Lanczos iterations:
Initialization:
$v_1 \leftarrow$ random vector with norm 1
$v_0 \leftarrow 0$
$\beta_1 \leftarrow 0$
Iteration: for j=1 to m
$p_j \leftarrow Pv_j$
$p_j \leftarrow Ap_j$
$p_j \leftarrow D^{-1} p_j$
$p_j \leftarrow A^T p_j$
$p_j \leftarrow P^T p_j$
$w_j \leftarrow p_j - \beta_j v_{j-1}$
$\alpha_j \leftarrow (w_j, v_j)$
$w_j \leftarrow w_j - \alpha_j v_j$
$\beta_{j+1} \leftarrow (w_j, w_j)$
$v_{j+1} \leftarrow w_j/\beta_j + 1$
Return The Lanczos iterations are performed to understand the behavior of the Fisher information operator. Preconditioner P may be a 3-D smoothing or steering operator.

In the above Lanczos iterations procedure, m iterations may be performed by stepping variable j from 1 to m. The outputs of the Lanczos iterations may be used to compute eigenvalues and eigenvectors (e.g., Ritz eigenvalues and eigenvectors) as follows, by first computing a tridiagonal matrix $T_{mm}$:

$$T_{mn} = \begin{pmatrix} \alpha_1 & \beta_1 & 0 & 0 & \cdots & 0 & 0 \\ \beta_2 & \alpha_2 & \beta_3 & 0 & \cdots & 0 & 0 \\ 0 & \beta_3 & \alpha_3 & \beta_4 & \cdots & 0 & 0 \\ \vdots & \vdots & \vdots & \vdots & \vdots & \vdots & \vdots \\ 0 & 0 & 0 & 0 & \vdots & \alpha_{m-1} & \beta_m \\ 0 & 0 & 0 & 0 & \vdots & \beta_m & \alpha_m \end{pmatrix}$$

$$= Y_T^{(m)} \Lambda_T^{(m)} Y_T^{(m)T}$$

Using the $v_1, v_2, \ldots, v_m$ outputs from the Lanczos iterations, the matrix $V_m$ is computed:

$$V_m = (v_1, v_2, \ldots, v_m)$$

Ritz eigenvalues are eigenvalues of $T_{mm}$, and Ritz eigenvectors are computed by $$U_m = V_m Y_T^{(m)T}.$$

The matrix $T_{mm}$ may be a tridiagonal matrix that contains the $\alpha$ and $\beta$ values output from the Lanczos iterations. The $Y_T$ matrix may be the eigenvector. From the foregoing, the inverse of $I_P$ may be obtained by $I_P^{-1} = U_{Ip} \Lambda_{Ip}^{-1} U_{Ip}^T$, where $U_{Ip} = U_m$ and $U_{Ip}^T = U_m^T$.

At step 230, a term based on a prior covariance matrix may be computed. The prior covariance matrix, $C_0 = E[\Delta x_p \Delta x_p^T]$, may represent uncertainties of parameters of the velocity model. In one implementation, the term may be $PC_0^{-1}P^T$. The inverse of the prior covariance matrix, $C_0^{-1}$, may be computed from the eigendecomposition of $C_0$: $U_0 \Lambda_0 U_0^T$. In another implementation, the term may be defined by a user.

At step 240, the partial eigendecomposition of the Fisher information operator (computed at step 220) may be combined with the term based on the prior covariance matrix (computed at step 230).

The combination may produce an updated eigendecomposition, $\Delta x_p$. Given the prior covariance matrix, $C_0$, the least squares solution to Equation 2 becomes:

$$\Delta x_p = C_p P^T A^T D^{-1} \Delta y \quad \text{(Equation 5)}$$

$$\text{where } C_p = [I_P + PC_0^{-1}P^T]^{-1} \quad \text{(Equation 6)}$$

may be the posterior covariance matrix of $\Delta x_p$. $I_P + PC_0^{-1}P^T$ may be a combination of the Fisher information matrix and a term containing the prior covariance matrix, $C_0$.

Since the partial eigendecomposition of the Fisher information matrix is computed in the absence of the prior covariance matrix $C_0$, the posterior covariance matrix $C_p$ can be computed in three main steps:

1. Compute the eigendecomposition $C_0 = U_0 \Lambda_0 U_0^T$ of the prior covariance matrix (optional);
2. Compute the eigendecomposition of the inverse of the Fisher information matrix; and
3. Compute the eigendecomposition of the posterior covariance matrix.

The first step may be performed by using a Lanczos iterations technique similar to that described above for the Fisher information matrix $I_p$. The eigendecomposition of $C_0$, $C_0^{-1}$ may be derived, similar to derivation of $I_p^{-1}$ using the eigendecomposition of $I_p$ above. Step 1 may be an optional step. The eigendecomposition of $C_0$ does not have to be computed if $C_0$ is relatively simple and thus $C_0^{-1}$ (the inverse of $C_0$) can be easily calculated. The eigendecomposition of $C_0$ may be performed for the purpose of calculating $C_0^{-1}$, if $C_0$ is relatively complex.

The third step (step 3) may be relatively trivial as a consequence of the eigendecomposition obtained in the second step (step 2), in particular when $C_0$ is diagonal.

Once the eigendecompositions of the Fisher information matrix $I_p$ and prior covariance matrix $C_0$ are calculated, the second step may be performed using a modified form of the Lanczos iterations technique. This example assumes that the eigendecomposition of $C_0$ has been computed.

The iterations of the Lanczos iterations technique may be tailored to take advantage of the eigendecompositions of the Fisher information and prior covariance matrices as follows:

Initialization:
$v_1 \leftarrow$ random vector with norm 1
$v_0 \leftarrow 0$
$\beta_1 \leftarrow 0$
Iteration: for j=1 to m
$u_j \leftarrow U_{I_p}^T v_j$
$u_j \leftarrow \Lambda_{I_p}^T u_j$
$u_j \leftarrow U_{I_p} u_j$
$p_j \leftarrow P^T v_j$
$p_j \leftarrow U_0^T p_j$
$p_j \leftarrow \Lambda_0 p_j$
$p_j \leftarrow U_0 p_j$
$p_j \leftarrow P p_j$
$w_j \leftarrow p_j + u_j - \beta_j v_{j-1}$
$\alpha_j \leftarrow (w_j, v_j)$
$w_j \leftarrow w_j - \alpha_j v_j$
$\beta_{j+1} \leftarrow (w_j, w_j)$
$v_{j+1} \leftarrow w_j / \beta_{j+1}$
Return In the above, m iterations may be performed. Note that in each iteration, $U_{I_p}^T$, $\Lambda_{I_p}^T$, $U_{I_p}$ are known as are $U_0$, $\Lambda_0$, and $U_0^T$ (computed in step 1 above in the eigendecomposition of the prior covariance matrix $C_0$). The Lanczos iterations may be followed by the computation of the Ritz eigenvalues and eigenvectors as discussed above so that $[I_p + PC_0^{-1}P^T]$ can be calculated. Following computation of $[I_p + PC_0^{-1}P^T]$, $[I_p + PC_0^{-1}P^T]^{-1}$ can be computed relatively trivially (in step 3) so that Equation 5 can be solved to find $\Delta x_p$.

At step 250, the update to the velocity model may be computed. The update may be computed using the updated eigendecomposition, $\Delta x_p$, produced at step 240.

Referring back to FIG. 1, at step 120, uncertainties of the tomographic update may be determined to produce a tomographic posterior covariance matrix. A posterior covariance matrix, computed as described above, may be used for uncertainty analysis of a model. This analysis may include the visualization and comparison of different parts of the posterior covariance matrix, such as the diagonal, rows, and quadratic forms.

Similarly, a resolution matrix corresponding to the posterior covariance matrix may be analyzed. The analysis can be performed for comparing various prior assumptions while varying a prior covariance matrix and for comparing different acquisition geometries.

To perform structural uncertainty analysis, a linear operator may be obtained that maps the variations in velocity and the anisotropic parameters $\epsilon$ and $\delta$ to variation of reflector location along the normal direction to the reflector, such as according to a technique described in C. Stork et al., "Linear Aspects of tomographic velocity analysis," Geophysics, Vol. 56, pp. 483-495 (1991), or in Marta Jo Woodward et al., "A Decade of Tomography," Vol. 73, pp. VE5-VE11 (2008). Herein, this linear operator is referred to as F.

Using the linear operator F, the tomographic posterior covariance matrix may be mapped onto a structural covariance matrix for a reflector location along the normal direction to the reflector by $C_s = F^T C F$, where C represents the posterior covariance matrix. Thus, the uncertainty in depth may be calculated using the correlated uncertainties in velocity and anisotropic parameters along the corresponding rays for each common-image-point (CIP).

At step 130, a geomechanical velocity model update may be calculated. The geomechanical velocity model update may be a geomechanical earth model containing salt geometry of the same subsurface modeled in the velocity model.

Figure 3:
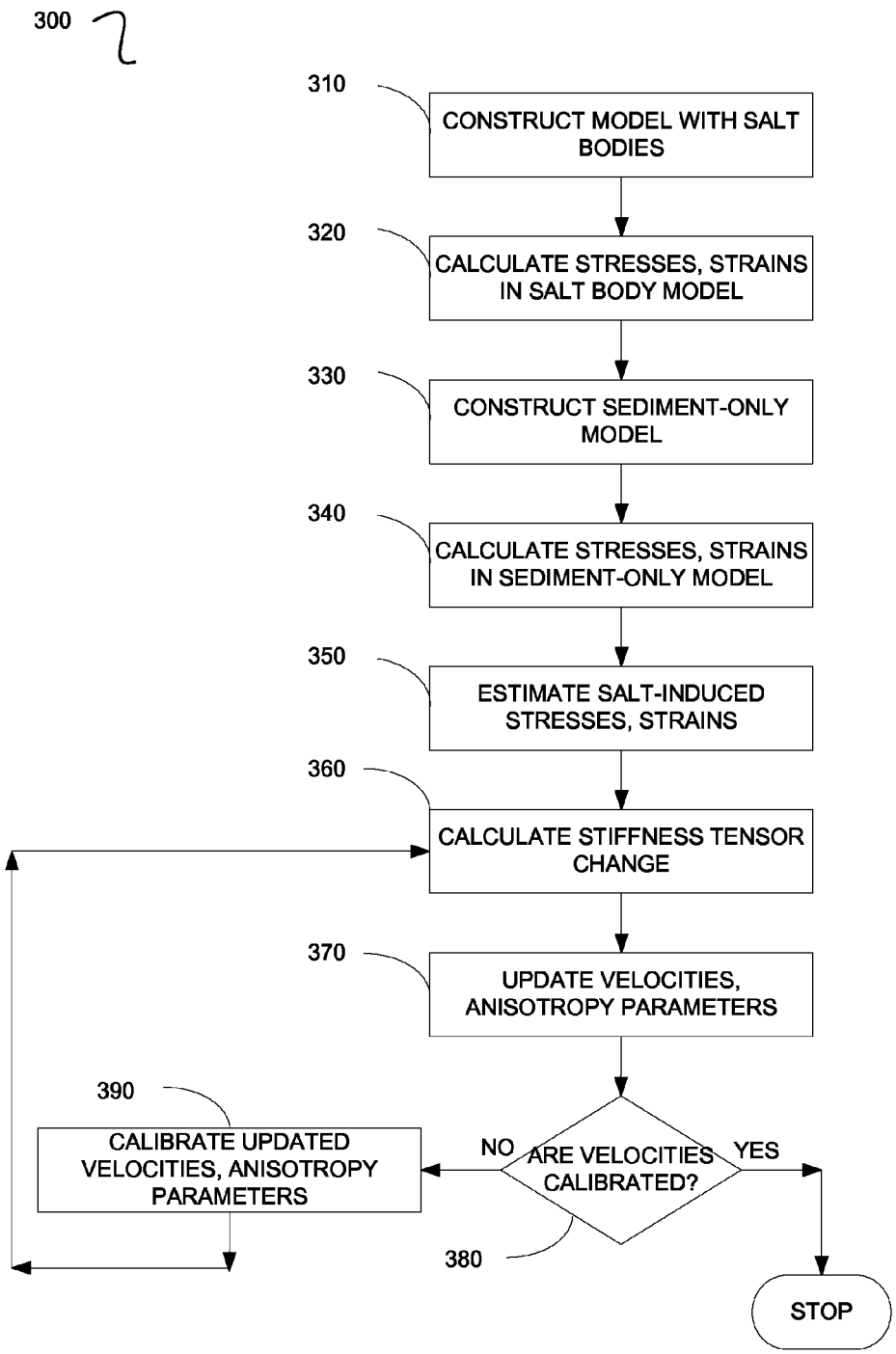
FIG. 3 is a flowchart illustrating a method of constructing a velocity model of a subsurface containing salt bodies in accordance with implementations described herein.

Calculating the geomechanical velocity model update is described in greater detail with reference to FIG. 3, which is a flow chart illustrating a method 300 for constructing a velocity model of a subsurface containing salt bodies in accordance with implementations described herein. It should be understood that while the flow chart indicates a particular order of execution of the operations, in some implementations, certain steps of method 300 may be executed in a different order.

At step 310, a velocity model of the subsurface containing one or more salt bodies may be constructed using the seismic data. The velocity model may also be referred to herein as a geomechanical earth model, which may be defined as a combination of a 3D seismic image and a set of physical properties assigned to each pixel in the 3D seismic image. In one implementation, the geomechanical earth model may be constructed using vintage seismic images to map salt bodies, and migration velocity analysis constrained by well log data.

Vintage seismic images refer to any seismic image of the same area, shot with a relatively older technology. For example, vintage seismic images may include single azimuth seismic images (as opposed to new wide-azimuth data), or conventional seismic images (as opposed to Q data). Vintage seismic images may also refer to old 3D lines, as opposed to new 3D data. The well log data may be interpolated in 3D using seismic horizons, which may be defined as visible layers in the 3D seismic image.

At step 320, the stresses and strains in the salt body model may be calculated. In one implementation, a numerical solver may be applied to the salt body model to solve for stress and strain associated with the salt body model. The numerical solver may include finite element equations, finite difference equations and the like. In one implementation, the numerical solver may be configured to solve a static elastic, visco-elastic, poro-elastic, elastic-plastic, basin, or sea-floor topographic model. In this manner, a three dimensional map of the stresses and strains associated with the geomechanical earth model may be derived.

In the case of a static elastic model, the strains may be determined using equilibrium equations, given by $$\begin{bmatrix} \frac{\partial \sigma_{11}}{\partial x_1} + \frac{\partial \sigma_{21}}{\partial x_2} + \frac{\partial \sigma_{31}}{\partial x_3} = f_1 \\ \frac{\partial \sigma_{12}}{\partial x_1} + \frac{\partial \sigma_{22}}{\partial x_2} + \frac{\partial \sigma_{32}}{\partial x_3} = f_2 \\ \frac{\partial \sigma_{13}}{\partial x_1} + \frac{\partial \sigma_{23}}{\partial x_2} + \frac{\partial \sigma_{33}}{\partial x_3} = f_3 \end{bmatrix} \qquad \text{(Equation 7)}$$

where $f_i$ are the body forces, and $\sigma_{ij}$ are the strains.

The constitutive relation is given by the generalized Hooke's law:

$$\sigma_{ij} = \sum_{kl} C_{ijkl} \varepsilon_{kl} \qquad \text{(Equation 8)}$$

where $C_{ijkl}$ is the stiffness tensor. In the case of visco-elastic modeling, the Constitutive 3-D visco-elastic law is written in the frequency domain when the stiffness tensor is complex $C^*_{ijkl}$.

The stress tensor may be decomposed into deviatoric stress, $S_{ij}$ and mean stress such that $\sigma_M = \sigma_{kk}/3$. Similarly, the strain tensor may be decomposed into mean and deviatoric strains such that $\epsilon_{ij} = e_{ij} - \delta_{ij} \epsilon_{kk}/3$. For a visco-elastic material, the stress strain relation is given by:

$$\sigma_{kk} = 3K\varepsilon_{kk} \qquad \text{(Equation 9)}$$

$$\left[\frac{1}{G}\partial_t + \frac{1}{\eta}\right] S_{ij} = [\partial_t] e_{ij}$$

or $$S_{ij} = \int_0^t G e^{(t-t')/\tau} \partial_{t'} e_{ij} \, dt'$$

if a Maxwell element is used to represent a visco-elastic salt. Note that the integral representation of the deviatoric stress is using Maxwell element creep function.

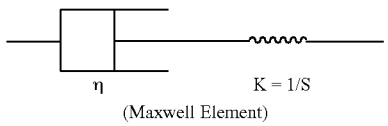

(Maxwell Element)

The field equation for 3-D visco-elastic solid is represented as follows:

$$\nabla \cdot \sigma = F \rightarrow$$

$$\nabla \cdot (S_{ij} - \delta_{ij}\sigma_M) = F \qquad \text{(Equation 10)}$$

Equation 9 shows Navier's equation (equilibrium of stress and body forces) and a visco-elastic Maxwell element as a constitutive equation. Note that if the viscosity is infinite everywhere, the visco-elastic approach becomes identical to the elastic approach. The visco-elastic behavior of salt may be approximated with an elastic constitutive law, if a very high Poisson's ratio (>0.49) is assigned to the salt body.

At step 330, a geomechanical earth model of the subsurface without the salt bodies may be constructed. This model is referred to herein as a sediment-only model. The velocity of the sediment-only model may be obtained from tomography, either before salt flood, or from compaction trends. At step 340, the stresses and strains in the sediment-only model may be calculated, using finite element equations, finite difference equations or the like.

The result of the finite element equations using the elastic constitutive model shows a significant effect of the salt geometry on the stresses and strains in the 3-D model. The salt itself has zero shear stresses inside it, but near the edges of the salt body, high deviatoric stresses, and large stress anisotropy are typically observed, especially near the areas showing significant topography. Similar results may be obtained using the visco-elastic model where the salt is modeled as a visco-elastic material.

At step 350, the salt-induced stresses and strains may be estimated. The estimation may be determined by subtracting the stresses and strains in the sediment-only model from the stresses and strains in the salt-body model.

At step 360, a change in stiffness tensor resulting from the salt-induced strains may be calculated. In one implementation, the stiffness tensor change may be calculated using third order elasticity theory.

Non-linear elasticity theory (Thruston, 1974) provides relationships between effective stiffness tensor $C_{ijkl}$ and principal strains $E_{mn}$:

$$C_{ijkl} = A_{ijkl} + A_{ijklmn} E_{mn} \qquad \text{(Equation 11)}$$

where $A_{ijkl}$ is the unstressed fourth-order stiffness tensor and can be represented as a second-order matrix $c_{ij0}$ in Voigt notation. The third-order elasticity theory may be used to compute the change in stiffness from the modeled change in strain due to the presence of the salt body, given by the equations:

$$c_{11} \approx c_{11}^0 + c_{111} E_{11} + c_{112}(E_{22} + E_{33})$$

$$c_{22} \approx c_{11}^0 + c_{111} E_{22} + c_{112}(E_{11} + E_{33})$$

$$c_{33} \approx c_{33}^0 + c_{111} E_{33} + c_{112}(E_{11} + E_{22})$$

$$c_{12} \approx c_{12}^0 + c_{112}(E_{11} + E_{22}) + c_{123} E_{33}$$

$$c_{13} \approx c_{13}^0 + c_{112}(E_{11} + E_{33}) + c_{123} E_{22}$$

$$c_{23} \approx c_{13}^0 + c_{112}(E_{22} + E_{33}) + c_{123} E_{11}$$

$$c_{66} \approx c_{66}^0 + c_{144} E_{33} + c_{155}(E_{11} + E_{22})$$

$$c_{55} \approx c_{55}^0 + c_{144} E_{22} + c_{155}(E_{11} + E_{33})$$

$$c_{44} \approx c_{44}^0 + c_{144} E_{11} + c_{155}(E_{22} + E_{33}) \qquad \text{(Equation 12)}$$

where $c_{ijk}$ are the third-order elasticity (TOE) coefficients. TOE coefficients may be obtained from laboratory measurements, estimated from Sonic Scanner measurements in well logs, or estimated from conventional well log data. The TOE coefficients may be locally calibrated to give reliable values of velocity and anisotropy that can be used in a quantitative manner.

Poroelasticity refers to constitutive relations in a two-phase system with a porous matrix (rock frame) and a pore-fluid that resides inside the pores of the rock frame. The constitutive relations of poroelasticity are described in greater detail in "Fundamentals of Poroelasticity," Chapter 5 in Comprehensive Rock Engineering: Principles, Practice and Projects, Vol. II, Analysis and Design Method, Detournay, E. and Cheng, A. H.-D., ed. C. Fairhurst, Pergamon Press, pp. 8-9 (1993).

Plastic deformation refers to irreversible deformation, i.e., when the strain/deformation is not recoverable upon reverting to the original stress state. One model for plastic deformation is described in greater detail in, "A Microcrack Model of Rock Inelasticity," Mechanics of Materials, Vol. 1, Kachanov, pp. 19-27 (1982).

At step 370, the change in the stiffness tensor may be used to update the velocity field in the salt-body model. The computation of the updated velocity field may include computation of anisotropy parameters because the velocity field is anisotropic in nature. The presence of complex salt structures may lead to large deviatoric stresses and strains near the edges of the salt body. Third-order elasticity theory predicts that large deviatoric stresses result in velocity anisotropy near the edges of the salt body.

The presence of salt may also lead to large density contrasts in the subsurface, as the salt is substantially lighter than the sediments around it. The density contrast causes large buoyant forces, which reduces the effective stress below the salt, resulting in significant velocity reduction below salt bodies.

At step 380, a determination is made as to whether the velocities and associated anisotropic parameters are calibrated. If so, method 300 stops. If the velocities are not calibrated, the flow continues to step 390.

At step 390, the velocities and anisotropic parameters may be calibrated to available data, such as well data or wide-azimuth seismic data. The calibrated velocities and anisotropic parameters may then be used to update the salt-body model. As such, the flow then returns to step 360, using the updated salt-body model.

In one implementation, measurements of velocity and anisotropy parameters from a subsalt well may be used to calibrate the TOE coefficients, and the calibrated TOE coefficients may then be used to re-update the salt-body model.

The TOE coefficients may be estimated by using an observation of local anisotropy. The stress modeling results together with the local anisotropy observations may be used to determine the TOE coefficients.

Referring back to FIG. 1, at step 140, uncertainties of the geomechanical velocity model update may be determined to produce a geomechanical posterior covariance matrix. Uncertainties in the geomechanical velocity model update may include (1) uncertainty in the salt geometry (especially the salt bottom), (2) uncertainties in the salt velocity and density, (3) uncertainty in the sediment velocity and density, (4) uncertainty in elastic properties of salt and sediment, and (5) the structural uncertainty of the salt top. These uncertainties may be estimated from seismic interpretation, rock physics models, or well-log data.

At step 150, the geomechanical velocity model update may be combined with the tomographic velocity model update produced at step 110. In one implementation, the combination may be performed by projecting the geomechanical velocity model update onto the null-space of the Fisher information matrix. It should be noted that the Fisher information matrix may be a sparse matrix that has regions with null data (i.e., no data or invalid data). The projection of the geomechanical velocity model update may update some of these null regions.

More specifically, the update may be calculated by projecting the geomechanical velocity model update onto the orthogonal complement of the space spanned by the Ritz eigenvectors of the Fisher information matrix, and then adding this projection to the original model perturbation. The combination does not alter the original model perturbation within the space spanned by the Ritz eigenvector. As a result, the updated model perturbation is consistent with the original one within this space.

Let $\Delta x_0$ represent the salt body model update. Define $\Delta x_w = W^{-1} \Delta x_0$ as the re-weighted desired update. A null-space projected update $\Delta x_N$ may be defined as the W weighted projection of $\Delta x_w$ onto the null space of the Ritz eigenvectors (the complement of the space spanned by the Ritz eigenvectors) of the Fisher information matrix corresponding to the original model perturbation $\Delta x$:

$$\Delta x_N = W\left[\Delta x_w - \sum_i (\Delta x_w, Y_i) Y_i\right], \quad \text{(Equation 13)}$$

where $Y_i = (Y_1, Y_2, \ldots Y_m)$ are the Ritz eigenvectors described above.

In another implementation, the combination may be performed using eigendecomposition of linear operators corresponding to data sources of the tomographic update performed at step 110 (seismic data), and the geomechanical velocity model update calculated at step 130. In other words, the data sources may be seismic and geomechanical.

Let $v$ and $\rho$ be the velocity and density in each volume (representing the subterranean structure) and $b$ denote the boundary of the volumes. The data obtained from seismic and geomechanics satisfy:

$$d_s = \begin{bmatrix} S_v & S_b \end{bmatrix} \begin{bmatrix} v \\ b \end{bmatrix}, \quad \text{(Equation 14)}$$

and $$d_g = \begin{bmatrix} G_b & G_\rho \end{bmatrix} \begin{bmatrix} b \\ \rho \end{bmatrix}, \quad \text{(Equation 15)}$$

respectively, where $S_v, S_b, G_b,$ and $G_\rho$ are matrices representing velocity and geomechanical data, respectively. Define models $m_s$ and $m_g$ by:

$$\begin{bmatrix} v \\ b \end{bmatrix} = m_s,$$

$$\begin{bmatrix} b \\ \rho \end{bmatrix} = m_g.$$

According to Equation 5, the solution for Equations 14 and 15 can be written as:

$$\hat{m}_s = I_s^{-1} \begin{bmatrix} S_v^T \\ S_b^T \end{bmatrix} d_s, \quad \text{(Equation 16)}$$

and $$\hat{m}_g = I_g^{-1} \begin{bmatrix} G_b^T \\ G_\rho^T \end{bmatrix} d_g. \quad \text{(Equation 17)}$$

Here $I_s$ and $I_g$ are the Fisher information matrices corresponding to velocity and geomechanical data, respectively, $$I_s = \begin{bmatrix} S_v^T S_v & S_v^T S_b \\ S_b^T S_v & S_b^T S_b \end{bmatrix} \quad \text{(Equation 18)}$$

and $$I_g = \begin{bmatrix} S_b^T S_b & S_b^T S_\rho \\ S_\rho^T S_b & S_\rho^T S_\rho \end{bmatrix}.$$

As long as two models agree on the boundary, seismic and geomechanical measurements can be jointly written as:

$$\begin{bmatrix} d_s \\ d_g \end{bmatrix} = \begin{bmatrix} S_v & S_b & 0 \\ 0 & G_b & G_\rho \end{bmatrix} \begin{bmatrix} v \\ b \\ \rho \end{bmatrix}. \quad \text{(Equation 19)}$$

Define $$m_{gs} = \begin{bmatrix} v \\ b \\ \rho \end{bmatrix}.$$

Then the solution to the joint problem of Equation 19 is computed by:

$$\hat{m}_{gs} = I_{gs}^{-1} \begin{bmatrix} S_v^T & 0 \\ S_b^T & G_b^T \\ 0 & G_\rho^T \end{bmatrix} \begin{bmatrix} d_s \\ d_g \end{bmatrix} \quad \text{(Equation 20)}$$

$$= I_{gs}^{-1} \left[ \begin{bmatrix} I_s \hat{m}_s \\ 0 \end{bmatrix} + \begin{bmatrix} 0 \\ I_g \hat{m}_g \end{bmatrix} \right],$$

where $$I_{gs} = \begin{bmatrix} I_s & \\ & 0 \end{bmatrix} + \begin{bmatrix} 0 & \\ & I_g \end{bmatrix} \quad \text{(Equation 21)}$$

is the Fisher information matrix for the joint problem. Assuming that $\hat{m}_s, \hat{m}_g$ and eigendecomposition of $1_s, 1_g$ are known a priori, the joint seismic-geomechanical inversion is obtained in three steps:

1. Perform modified Lanczos iterations discussed for the first embodiment on the eigendecomposition of $1_s$ and $1_g$, followed by the computation of Ritz eigenvalues and eigenvectors of $1_{gs}$;
2. Compute the inverse $I_{gs}^{-1}$ of $I_{g3}$;
3. Compute $$I_{gs}^{-1} \begin{bmatrix} I_s \hat{m}_s \\ 0 \end{bmatrix},$$

$$I_{gs}^{-1} \begin{bmatrix} 0 \\ I_g \hat{m}_g \end{bmatrix}$$

and sum the results.

In the foregoing, an eigendecomposition of the Fisher information operator for seismic data (from a first data source) is computed, and an eigendecomposition of the Fisher information operator for geomechanical data (from a second data source) is computed. The eigendecompositions of the Fisher information operator from the different sources are combined to provide a combined (updated) eigendecomposition for $I_{gs}$. From the combined eigendecomposition, $I_{gs}^{-1}$ can be calculated, and the updated model (that takes into account data from both data sources) can be calculated One form of geomechanical data is the geomechanical velocity model update itself. In that case, the Fisher information matrix corresponding to geomechanical data is the inverse of the geomechanical posterior covariance matrix determined at step 140.

One form of seismic data in the current context is tomographic velocity model update itself. In that case, the Fisher information matrix corresponding to seismic data is the inverse of the tomographic posterior covariance matrix determined at step 120.

The combined model (that takes into account data from multiple sources) can also further be updated using a prior mean and covariance matrix of velocity and geomechanics. In the presence of a prior mean and covariance matrix of velocity and geomechanics, $$m_0 = \begin{bmatrix} v_0 \\ 0 \\ \rho_0 \end{bmatrix}$$

and $$C_0^{-1} = \begin{bmatrix} C_{0vv}^{-1} & & C_{0v\rho}^{-1} \\ & 0 & \\ C_{0\rho v}^{-1} & & C_{0\rho\rho}^{-1} \end{bmatrix}$$

respectively, the inversion formula (Equation 20) becomes:

$$m_{gs0} = I_{gs0}^{-1} \left[ \begin{bmatrix} I_s \hat{m}_s \\ 0 \end{bmatrix} + \begin{bmatrix} 0 \\ I_g \hat{m}_g \end{bmatrix} + C_0^{-1} m_0 \right], \quad \text{(Equation 22)}$$

where $I_{gs0} = I_{gs} + C_0^{-1}$. The inverse of $I_{gs0}$ is computed using the eigendecompositions of $I_{gs}$ and $C_0$ using the Lanczos iteration technique described with respect to FIG. 2.

At step 160, it may be determined whether the combined models have converged. The convergence may be determined by comparing the combinations produced at step 150 in subsequent iterations of method 100. In one implementation, a difference between the combinations may be determined based on a difference in velocities. If the difference is above a specified threshold, it may be determined that the combinations are not converged. If there is convergence, method 100 may stop. If there is not convergence, the method may flow to step 110. It should be noted that step 160 is optional.

Figure 4:
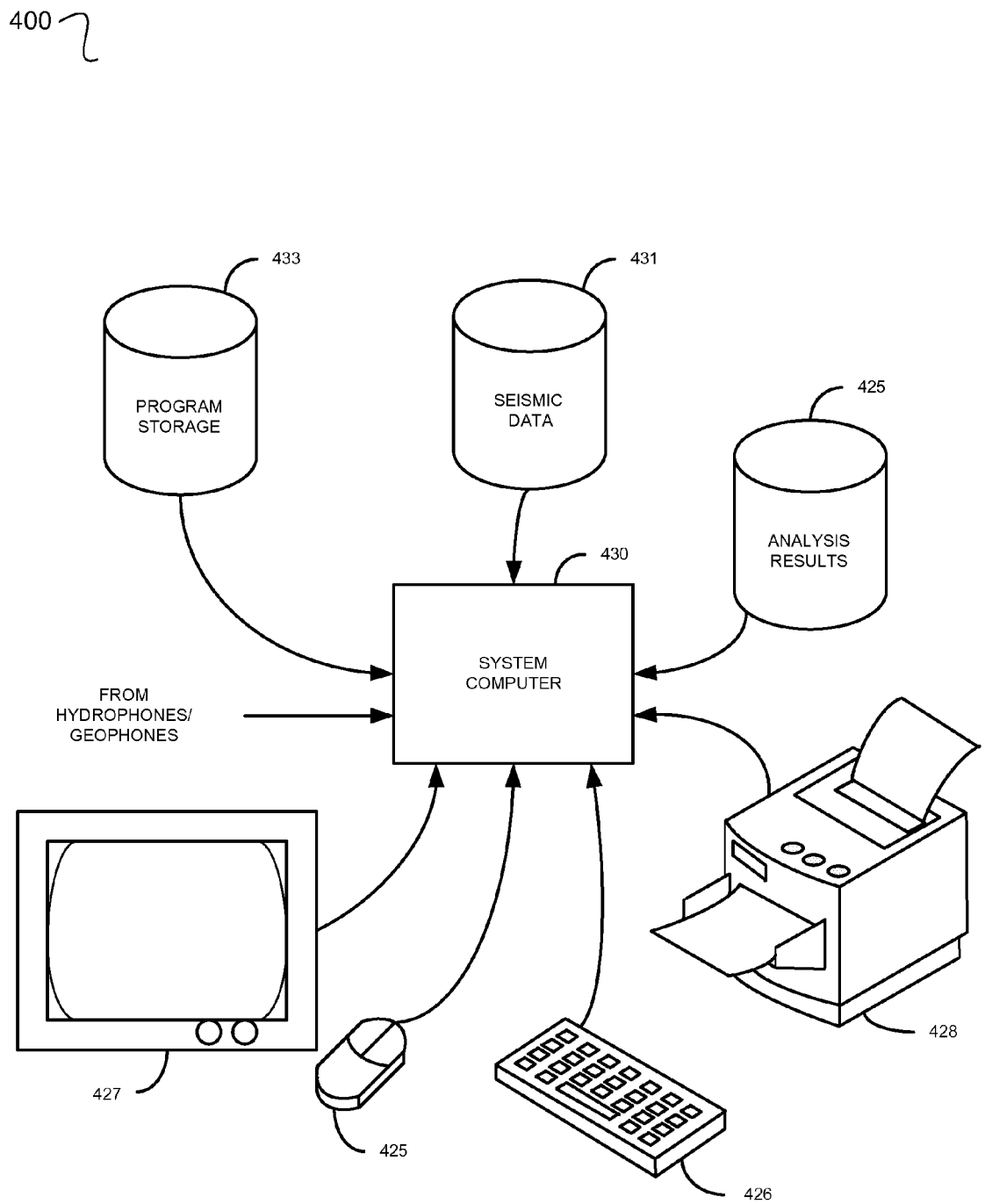
FIG. 4 illustrates a computer network, into which embodiments of the invention may be implemented.

FIG. 4 illustrates a computer network 400, into which embodiments of the invention may be implemented. The computer network 400 includes a system computer 430, which may be implemented as any conventional personal computer or workstation, such as a UNIX-based workstation. The system computer 430 is in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one embodiment, seismic data from hydrophones are stored in disk storage device 431. The system computer 430 may retrieve the appropriate data from the disk storage device 431 to perform the combination according to program instructions that correspond to the methods described herein. The program instructions may be written in a computer programming language, such as C++, Java and the like. The program instructions may be stored in a computer-readable memory, such as program disk storage device 433. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 430 presents output primarily onto graphics display 427, or alternatively via printer 428. As an example, the system computer may display updated velocity model on the graphics display 427. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 is in communication with hydrophones (either directly or via a recording unit, not shown), to receive signals indicative of the reflected seismic energy. These signals, after conventional formatting and other initial processing, are stored by the system computer 430 as digital data in the disk storage 431 for subsequent retrieval and processing in the manner described above.

While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for updating a velocity model of a subsurface of the earth, comprising:
performing, using a processor, a tomographic update to the velocity model of the subsurface of the earth to generate a tomographic velocity model update, wherein the tomographic velocity model update is based at least in part on an eigendecomposition of survey data regarding the subsurface of the earth, wherein the tomographic update to the velocity model comprises survey data regarding the subsurface of the earth acquired using one or more seismic receivers;
calculating a geomechanical velocity model update of the subsurface of the earth, wherein the calculating comprises:
constructing a first geomechanical earth model, having salt geometry, of the subsurface of the earth using the survey data,
constructing a second geomechanical earth model, without the salt geometry, of the subsurface of the earth using the survey data, and
updating the first geomechanical earth model using a stiffness tensor change calculated between the first and second geomechanical earth models based on and induced by the salt geometry; and
combining the geomechanical velocity model update with the tomographic velocity model update to produce a first combination.

2. The method of claim 1, wherein calculating the geomechanical velocity model update is based on one of the following:
a static elastic model of the subsurface;
a visco-elastic model of the subsurface;
a poro-elastic model of the subsurface;
an elastic-plastic model of the subsurface;
a basin model of the subsurface; or
a sea-floor topographic model of the subsurface.

3. The method of claim 1, further comprising:
determining a difference between the first combination and a second combination, wherein the second combination is based on a second tomographic velocity model update and a second geomechanical velocity model update; and
determining subsequent differences between the first combination and a plurality of subsequent combinations, wherein the plurality of subsequent combinations is based on subsequent tomographic velocity model updates and subsequent geomechanical velocity model updates,
wherein determining the subsequent differences continues until the subsequent differences converge to a specified threshold.

4. The method of claim 3, further comprising determining whether the difference falls within a specified threshold.

5. The method of claim 1, wherein performing the tomographic update to the velocity model comprises:
defining a Fisher information operator containing values derived from survey data regarding the subsurface;
computing a partial eigendecomposition of the Fisher information operator;
computing a term based on prior covariance matrix of the velocity model; and
combining the term with the partial eigendecomposition of the Fisher information operator.

6. The method of claim 5, wherein the partial eigendecomposition of the Fisher information operator is computed using a Lanczos iterations technique.

7. The method of claim 1, wherein combining the geomechanical velocity model update with the tomographic velocity model update comprises projecting the geomechanical velocity model update onto an orthogonal complement of a space spanned by one or more Ritz eigenvectors of a Fisher information operator having values derived from survey data regarding the subsurface.

8. The method of claim 1, wherein combining the geomechanical velocity model update with the tomographic velocity model update comprises:
determining a tomographic posterior covariance matrix having one or more uncertainties of the tomographic velocity model update;
determining a geomechanical posterior covariance matrix having one or more uncertainties of the geomechanical velocity model update;
computing an eigendecomposition of an inverse of a Fisher information matrix corresponding to the tomographic posterior covariance matrix; and
computing an eigendecomposition of an inverse of a Fisher information matrix corresponding to the geomechanical posterior covariance matrix.

9. The method of claim 8, further comprising determining an uncertainty for the geomechanical velocity model update of at least one of the following:
- a salt velocity;
- a salt density;
- a sediment velocity;
- a sediment density;
- an elastic property of salt;
- an elastic property of sediment; and
- a structural uncertainty in the salt top.

10. The method of claim 1, wherein calculating the geomechanical velocity model update comprises:
- determining a set of attributes induced by the salt geometry based on the first geomechanical earth model and the second geomechanical earth model; and
- calculating the stiffness tensor change between the second geomechanical earth model and the first geomechanical earth model, based on the set of attributes induced by the salt geometry.

11. The method of claim 1, wherein the stiffness tensor change is calculated using a third order elasticity theory having third order elasticity coefficients, wherein at least one coefficient is a velocity parameter or anisotropy parameter for a geomechanical velocity model.

12. A non-transitory computer-readable storage medium, comprising program instructions executable by a computer processor to:
- perform a tomographic update to a velocity model of a subsurface of the earth to generate a tomographic velocity model update, wherein the tomographic velocity model update is based at least in part on an eigendecomposition of the seismic survey data, wherein the tomographic update to the velocity model comprises survey data regarding the subsurface acquired using one or more seismic receivers;
- calculate a geomechanical velocity model update of the subsurface of the earth, wherein the geomechanical velocity model update is based at least in part on an eigendecomposition of geomechanical data, wherein the program instructions to calculate the geomechanical velocity model update further comprise program instructions executable by the computer processor to:
  - construct a first geomechanical earth model, having salt geometry, of the subsurface of the earth using the survey data,
  - construct a second geomechanical earth model, without the salt geometry, of the subsurface of the earth using the survey data, and
  - update the first geomechanical earth model using a stiffness tensor change calculated between the first and second geomechanical earth models based on and induced by the salt geometry; and
- combine the geomechanical velocity model update with the tomographic velocity model update to produce a first combination.

13. The non-transitory computer-readable storage medium of claim 12, wherein the program instructions executable by the computer processor to combine the geomechanical velocity model update with the tomographic velocity model update comprise program instructions executable by a computer processor to:
- project the geomechanical velocity model update onto an orthogonal complement of a space spanned by one or more Ritz eigenvectors of a Fisher information operator having values derived from the seismic survey data regarding the subsurface.

14. The non-transitory computer-readable storage medium of claim 12, wherein the tomographic update to the velocity model is performed by program instructions executable by the computer processor to:
- define a Fisher information operator containing values derived from the seismic survey data regarding the subsurface;
- compute a partial eigendecomposition of the Fisher information operator;
- compute a term based on prior covariance matrix of the velocity model; and
- combine the term with the partial eigendecomposition of the Fisher information operator.

15. The non-transitory computer-readable storage medium of claim 14, wherein the partial eigendecomposition of the Fisher information operator is computed using a Lanczos iterations technique.

16. The non-transitory computer-readable storage medium of claim 12, wherein the program instructions executable by the computer processor to combine the geomechanical velocity model update with the tomographic velocity model update comprise program instructions executable by the computer processor to:
- determine a tomographic posterior covariance matrix having one or more uncertainties of the tomographic velocity model update;
- determine a geomechanical posterior covariance matrix having one or more uncertainties of the geomechanical velocity model update;
- compute an eigendecomposition of an inverse of a Fisher information matrix corresponding to the tomographic posterior covariance matrix; and
- compute an eigendecomposition of an inverse of a Fisher information matrix corresponding to the geomechanical posterior covariance matrix.

17. The non-transitory computer-readable storage medium of claim 12, further comprises program instructions executable by the computer processor to:
- determine a difference between the first combination and a second combination, wherein the second combination is based on a second tomographic velocity model update and a second geomechanical velocity model update; and
- determine subsequent differences between the first combination and a plurality of subsequent combinations, wherein the plurality of subsequent combinations is based on subsequent tomographic velocity model updates and subsequent geomechanical velocity model updates, wherein the subsequent differences continue to be determined until the subsequent differences converge to a specified threshold.

18. A computer system, comprising:
- a computer processor; and
- a memory comprising program instructions executable by the computer processor to:
  - perform a tomographic update to a velocity model of a subsurface of the earth to generate a tomographic velocity model update, wherein the tomographic velocity model update is based at least in part on an eigendecomposition of data from different survey data sources, and wherein the tomographic update to the velocity model comprises survey data regarding the subsurface of the earth acquired using one or more seismic receivers;
  - calculate a geomechanical velocity model update of the subsurface of the earth, wherein the program instructions to calculate the geomechanical velocity model update further comprise program instructions executable by the computer processor to:

construct a first geomechanical earth model, having salt geometry, of the subsurface of the earth using the survey data, construct a second geomechanical earth model, without the salt geometry, of the subsurface of the earth using the survey data, and update the first geomechanical earth model using a stiffness tensor change calculated between the first and second geomechanical earth models based on and induced by the salt geometry; and combine the geomechanical velocity model update with the tomographic velocity model update to produce a first combination.

19. The computer system of claim 18, wherein the program instructions executable by the computer processor to combine the geomechanical velocity update with the tomographic velocity update comprise program instructions executable by the computer processor to:

determine a tomographic posterior covariance matrix having one or more uncertainties of the tomographic velocity update;

determine a geomechanical posterior covariance matrix having one or more uncertainties of the geomechanical velocity update;

compute an eigendecomposition of an inverse of a Fisher information matrix corresponding to the tomographic posterior covariance matrix; and compute an eigendecomposition of an inverse of a Fisher information matrix corresponding to the geomechanical posterior covariance matrix.

\* \* \* \* \*